G. H. SPENCER.
Turn-Buckle.
No. 161,832.  Patented April 6, 1875.
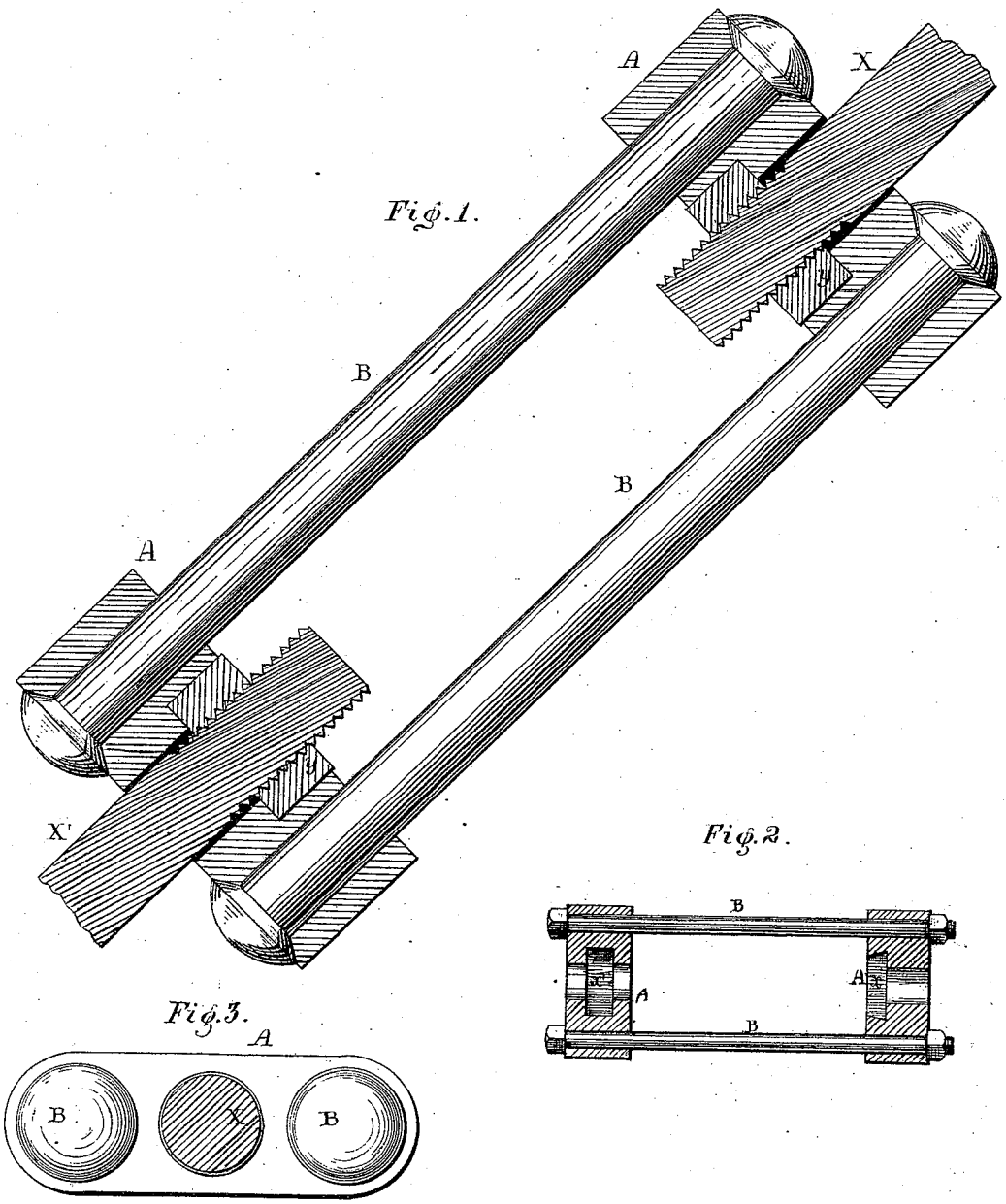

UNITED STATES PATENT OFFICE.

GEORGE HARRISON SPENCER, OF JERSEY CITY, NEW JERSEY.

IMPROVEMENT IN TURN-BUCKLES.

Specification forming part of Letters Patent No. 161,832, dated April 6, 1875; application filed April 8, 1874.

*To all whom it may concern:*

Be it known that I, GEORGE HARRISON SPENCER, of Jersey City, Hudson county, New Jersey, have invented an Improved Turn-Buckle, of which the following is a specification:

The object of my invention is a turn-buckle consisting of blocks A A, of malleable cast-iron, and connecting parallel rods or bolts B B, which extend through openings at the ends of the blocks and are riveted or provided with nuts at the ends, the whole forming an oblong rigid frame. Central openings may be bored in the blocks A A and threaded to receive the threaded ends of the rods X X', to be connected as in ordinary turn-buckles; but a preferable construction consists in recessing the blocks, forming sockets to receive nuts $y$ $y$, adapted to the threaded ends of the rods, the sockets and central openings in the blocks being of such dimensions as to admit rods and nuts of different sizes, so that one frame may be employed with rods of various dimensions.

The mode of constructing the frame renders unnecessary the tedious and expensive forging, and greatly reduces the weight of wrought metal heretofore required, resulting in a most material reduction in the cost of the articles.

It will be apparent that straps or tubes may be substituted for the rods or bolts, and that the form of the blocks A A may be altered without departing from the main features of my invention, which consists of a turn-buckle made of cast and wrought metal combined to form a rigid frame similar to the wrought frame of an ordinary turn-buckle. It will also be seen that the sockets may be dovetailed to receive nuts of corresponding shape, as shown at X, Fig. 3, or that the socket may be arranged, as shown at $x'$, so that the nut is completely inclosed, except on the side at which it is introduced.

I claim—

1. A turn-buckle consisting of cast-metal blocks A A and connecting-bars B B, the whole forming a rigid oblong frame, as set forth.

2. The blocks A A, connected together and having sockets for the reception of nuts $y$ $y$, as specified.

In testimony whereof I have signed my name to this specification in the presence of two subscribing witnesses.

GEORGE HARRISON SPENCER.

Witnesses:
 JOHN B. HAIGHT,
 JOHN H. GERMAN.